Jan. 13, 1931. F. VEYSSIERE ET AL 1,788,695
BRAKING DEVICE FOR AIRPLANE WHEELS
Filed Feb. 13, 1930 2 Sheets-Sheet 1

INVENTORS:
F. Veyssiere
M. Jay
J. R. Mondon
By: Marks & Clerk
Attys.

Jan. 13, 1931.　　F. VEYSSIERE ET AL　　1,788,695
BRAKING DEVICE FOR AIRPLANE WHEELS
Filed Feb. 13, 1930　　2 Sheets-Sheet 2

INVENTORS:
F. Veyssiere
M. Jay
J. R. Mondon
By: Marks Clark
ATTYS.

Patented Jan. 13, 1931

1,788,695

UNITED STATES PATENT OFFICE

FRANÇOIS VEYSSIERE, OF PARIS, MARCEL JAY, OF LEVALLOIS-PERRET, AND JEAN RENÉ MONDON, OF BOIS COLOMBES, FRANCE, ASSIGNORS TO SOCIÉTÉ "LA ROUE ROBUR," OF REIMS, MARNE DEPARTMENT, FRANCE

BRAKING DEVICE FOR AIRPLANE WHEELS

Application filed February 13, 1930, Serial No. 428,185, and in France April 11, 1929.

The present invention has for object a braking device serving to progressively stop airplanes, upon landing, in a distance the length of which is approximately predetermined or is variable at the pilot's desire.

In accordance with this invention, the wheels of the airplane are subjected to the action of brakes which are released during flight and are progressively applied in the course of landing by a pneumatic control actuated by the rotation of these wheels themselves.

A form of construction of this device is illustrated, by way of example, in the accompanying drawing.

Figure 1:
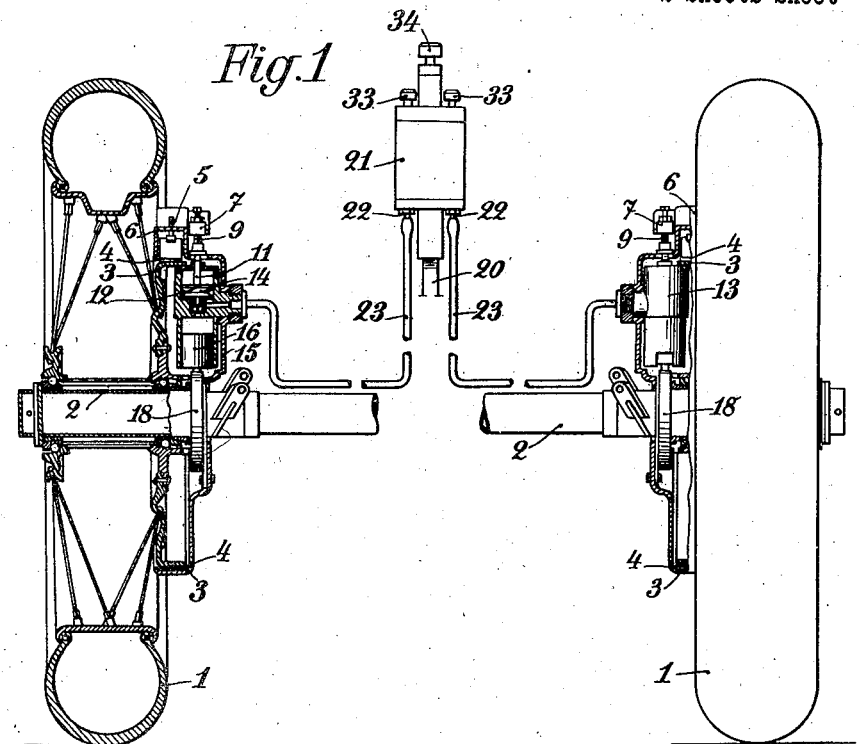
Fig. 1 is an elevation, partly in section, of the said device.
Figure 2:
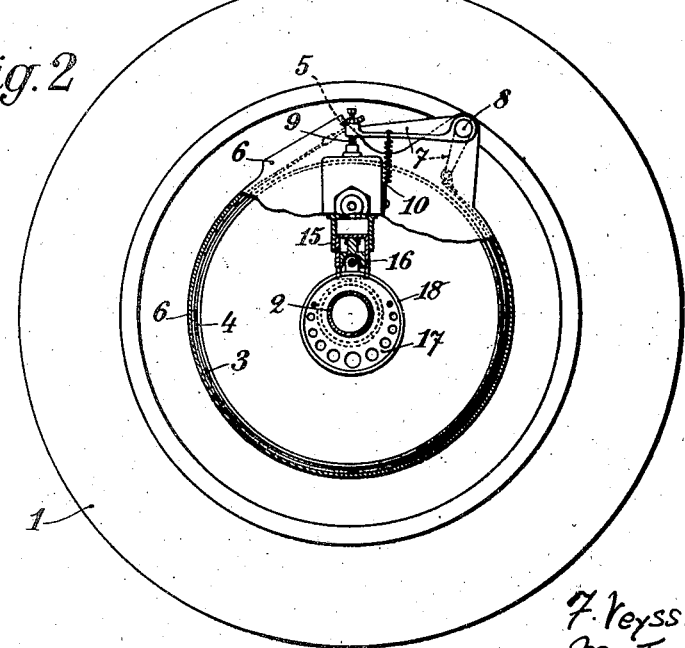
Fig. 2 is a section, on an enlarged scale, made according to the axis of the main parts of the device.
Figure 3:
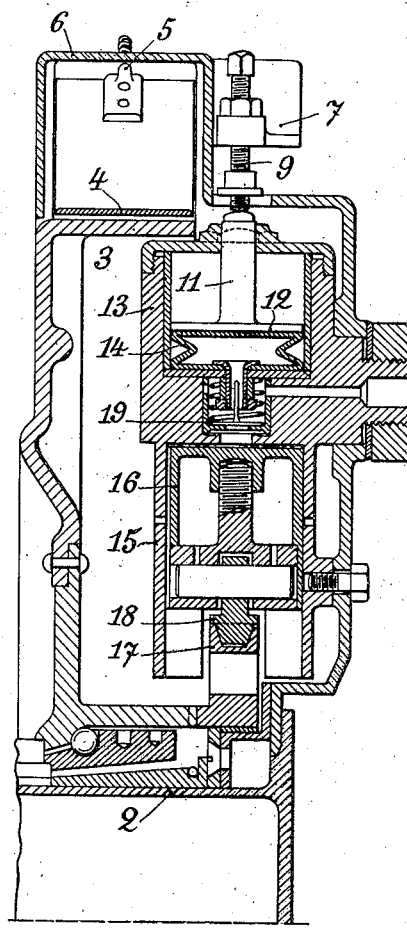

Fig. 3 diagrammatically illustrates a band brake mounted on one of the wheels, and parts connected thereto.

Figure 4:
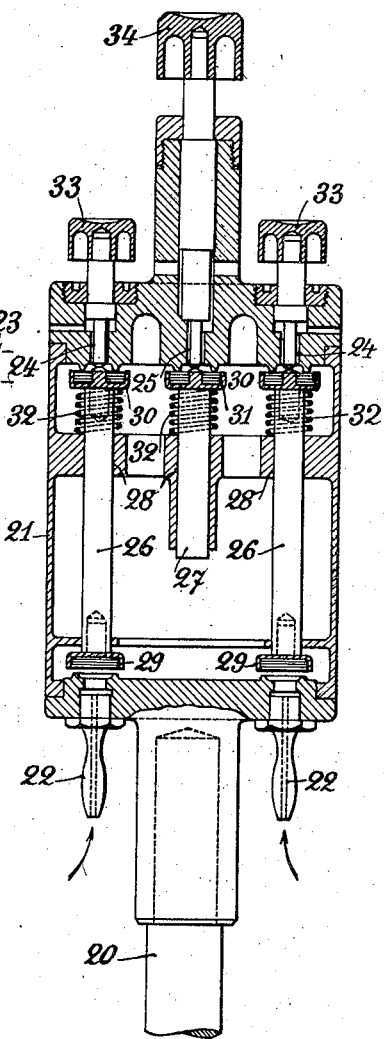

Fig. 4 is a section of distributor serving to control the action of the brakes.

The wheels 1 of the landing gear are loosely mounted on an axle 2 and each carry a brake pulley 3 about which is arranged a brake band 4; one end of the latter is attached, at 5, in a casing 6 rigidly mounted on the axle, and the other end of the brake band is attached to a lever 7 pivoted at 8 on this casing. The long arm of this lever presses, through the medium of an adjusting screw 9 and under the action of a returning spring 10, upon the rod 11 of a piston 12 sliding in a cylinder 13 secured in the casing 6. This piston rests on bellows 14 enclosed in this cylinder 13 and in which air can be compressed by the action of a pump 15 also secured in the casing 6. The piston 16 of this pump is driven by an eccentric 17 secured to the hub of the wheel and by an eccentric strap 18 attached to this piston. Upon each revolution of the wheel 1, the piston 16 moves to-and-fro in the pump barrel 15, sucking air from the atmosphere and delivering it, through a check valve 19, within the bellows 14. It results therefrom that as the airplane runs on the ground, the pressure exerted on the levers 7 increases, as well as the application of the brakes.

In order to allow the pilot to control the action of the brakes, a kind of distributor, illustrated in detail in Fig. 4, is arranged within reach of the pilot, preferably on the control lever or joy-stick 20. The distributor comprises a box or casing 21 in the bottom of which are mounted two nozzles 22 respectively connected by conduits 23 to the chambers of the valves 19 of the right-hand and left-hand wheels. On the other hand, the cover of this box or casing is perforated with two orifices 24 situated opposite the nozzles 22, and with a central orifice 25. Within the casing 21, opposite the said orifices, are arranged three sliding rods 26, 26, 27, which slide in guides 28. The rods 26 carry at their ends valves 29 and 30 adapted to alternatively obturate the nozzles 22 and the orifices 24, and the rod 27 carries a valve 31 adapted to obturate the orifice 25. Springs 32 normally lift these valves so as to close the orifices 24, 25. Finally, on the cover are mounted knobs 33, 33, 34 allowing to lower these valves at will in order to allow the compressed air to escape from the casing 21.

In these conditions, the valves 29 are normally lifted and the pressures in the bellows of both wheels can balance each other owing to the communication established through the conduits 23 and the casing 21. By reason of this balance, the actions of both brakes are equal and the airplane can run on the ground in a straight line. When the pilot desires to effect a turn, to the right for instance, he presses upon the right-hand knob 33; it results therefrom that the right-hand nozzle 22 is closed and the compressed air contained in the right-hand bellows 14 continues to act with an increasing force; at the same time, the left-hand orifice 22 is open and allows air to escape from the casing or box 21 and from the left-hand bellows; consequently, the left-hand brake is released and the left-hand wheel can rotate more rapidly than the right-hand wheel, as is necessary so as not to prevent effecting a turn.

The manipulation of the left-hand knob 33 facilitates in the same manner the left-hand turns.

By pressing upon the knob 34, the pilot can allow a greater or less quantity of compressed air to escape and, consequently, he can reduce at will the pressure in both bellows 14 at the same time, thus diminishing or suppressing the braking on both wheels.

The device illustrated has the advantage of placing at the pilot's disposal a positive and convenient means for obtaining, upon landing, a progressive braking adjustable at will on both wheels, or independently on each wheel, and this without any effort and without abandoning the steering member.

It is to be noted that the transmitting medium used is atmospheric air, so that there is no need to transport it, and that leakage at the joints of the pipe, lines or pumps, etc., is without importance.

It is to be understood that, without departing from the scope of the invention, it will be possible to use any brakes other than the band brakes illustrated, that any air pump can be employed, that the mechanism driving the pumps and actuated by the wheels may be varied, and that the pressure generated by the pumps can be caused to act on the brakes by any means other than the bellows 14 and levers 7; likewise, the arrangement of the distributor for causing the compressed air or like chambers 14 to communicate together and with the atmosphere can be varied, as instead of flap valves, use can be made for instance of slide or rotary valves, etc., which are easy to devise.

Claims:

1. Braking device for the wheels of airplane landing gears, comprising in combination with each of the side wheels of the landing gear, a brake on this wheel, an air pump actuated by the rotation of the said wheel, means for applying the said brake and actuated by the air compressed by the said pump, and a distributor adapted to be controlled by the pilot, this distributor comprising a box, two conduits respectively connecting this box with the means actuated by the compressed air on both sides of the landing gear, inlet valves in this box, adapted to normally allow the said conduits to communicate with the box, exhaust orifices in the said box, exhaust valves on the said orifices, two of these exhaust valves being operatively connected to the said inlet valves, and operating members adapted to open the said exhaust valves respectively, substantially as described and for the purpose set forth.

2. Braking device for the wheels of airplane landing gears, comprising in combination with each of the side wheels of the said landing gear, a brake on this wheel, an air pump actuated by the rotation of the said wheel, means for applying the said brake and actuated by the air compressed by the said pump, and a distributor adapted to be placed on the "joy stick" of the airplane and comprising a box having orifices which are connected to the delivery orifices of the two said air pumps and to the atmosphere, and valves controlling the said orifices of the box, these valves being adapted to be controlled by the pilot with the same hand holding the "joy stick".

3. Braking device for the wheels of airplane landing gears, comprising in combination with each of the said wheels of the said landing gear a brake on this wheel, an air pump actuated by the rotation of the said wheel, means for applying the said brake and actuated by the air compressed by the said pump, a distributor adapted to be placed on the "joy stick" of the airplane and comprising an air box, conduits connecting this box to the delivery orifices of the two said pumps and valves on these conduits, each of these valves being adapted to be controlled by the pilot and to put the said box alternatively in communication with the said respective conduit or with the atmosphere.

In testimony whereof we have hereunto affixed our signatures.

FRANÇOIS VEYSSIERE.
MARCEL JAY.
JEAN RENÉ MONDON.